(12) United States Patent
Maki-Ontto et al.

(10) Patent No.: US 10,323,960 B2
(45) Date of Patent: Jun. 18, 2019

(54) METHOD OF MAKING SENSING MECHANISM AND MACHINE SYSTEM USING SAME

(71) Applicant: Ingersoll-Rand Company, Davidson, NC (US)

(72) Inventors: Petri Juhani Maki-Ontto, Espoo (FI); Lauri Juhani Salmia, Vantaa (FI); Tomas Janda, Prague 4 (CZ)

(73) Assignee: Ingersoll-Rand Company, Davidson, NC (US)

( * ) Notice: Subject to any disclaimer, the term of this patent is extended or adjusted under 35 U.S.C. 154(b) by 3 days.

(21) Appl. No.: 14/974,745

(22) Filed: Dec. 18, 2015

(65) Prior Publication Data

US 2016/0187159 A1     Jun. 30, 2016

Related U.S. Application Data

(60) Provisional application No. 62/098,488, filed on Dec. 31, 2014.

(51) Int. Cl.
*G01D 5/20* (2006.01)

(52) U.S. Cl.
CPC ................ *G01D 5/2086* (2013.01)

(58) Field of Classification Search
CPC ......... G01D 5/12–5/24495; H02P 6/16–6/188; H01B 7/003
See application file for complete search history.

(56) References Cited

U.S. PATENT DOCUMENTS

| | | | |
|---|---|---|---|
| 4,991,301 A | | 2/1991 | Hore |
| 5,467,718 A | * | 11/1995 | Shibata ............... B60L 13/10 104/284 |
| 5,602,681 A | * | 2/1997 | Nakayama ............ G01D 5/145 324/207.21 |
| 5,691,625 A | | 11/1997 | Kumar et al. |
| 5,691,638 A | * | 11/1997 | Bahn .................... H02K 29/08 318/653 |
| 5,734,266 A | | 3/1998 | Spies |
| 5,763,976 A | | 6/1998 | Huard |
| 6,084,676 A | * | 7/2000 | Kexin ................. A61B 5/0073 356/39 |
| 6,163,117 A | * | 12/2000 | Rappenecker ........... H02P 6/22 318/400.04 |
| 6,528,989 B1 | * | 3/2003 | Hansen ................. G01B 7/003 324/207.12 |
| 6,555,977 B1 | | 4/2003 | Du et al. |

(Continued)

*Primary Examiner* — Huy Q Phan
*Assistant Examiner* — David B Frederiksen
(74) *Attorney, Agent, or Firm* — Taft Stettinius & Hollister LLP

(57) ABSTRACT

A method of making a machine system includes assembling sensing elements with a sensor frame, and contacting ferrite cores of the sensing elements with a locating tool to conform an arrangement of the sensing elements to a cylindrical shape of a surface of the locating tool. The sensing elements are secured to the sensor frame in the determined arrangement, and coupled with a housing of a machine system to monitor position of a rotatable component therein. The ferrite cores may be E-type cores, with bridge connections used to sensitize the sensing mechanism to displacement of a rotatable component in X, Y, and Z directions.

18 Claims, 6 Drawing Sheets

(56) References Cited

U.S. PATENT DOCUMENTS

| | | | |
|---|---|---|---|
| 6,603,230 B1* | 8/2003 | Abel | F16C 32/0444 |
| | | | 310/74 |
| 6,674,280 B1 | 1/2004 | Goetz et al. | |
| 6,930,423 B2 | 8/2005 | Kitazawa | |
| 7,482,803 B2 | 1/2009 | Lee et al. | |
| 8,994,376 B2* | 3/2015 | Billeres | A61B 5/097 |
| | | | 324/260 |
| 9,853,525 B2* | 12/2017 | Wu | F16C 32/0446 |
| 2002/0066607 A1* | 6/2002 | Levin | B60K 6/22 |
| | | | 180/65.25 |
| 2002/0171388 A1* | 11/2002 | Seki | B60L 15/025 |
| | | | 318/727 |
| 2003/0122541 A1 | 7/2003 | Lantto | |
| 2004/0051499 A1* | 3/2004 | Kameda | G05B 19/19 |
| | | | 320/104 |
| 2005/0200351 A1* | 9/2005 | Shimizu | G01D 5/2086 |
| | | | 324/207.15 |
| 2007/0209437 A1* | 9/2007 | Xue | B81B 3/0032 |
| | | | 73/514.31 |
| 2008/0054898 A1* | 3/2008 | Hausperger | G01R 15/185 |
| | | | 324/260 |
| 2009/0281387 A1* | 11/2009 | Takizawa | A61B 1/00082 |
| | | | 600/117 |
| 2010/0036640 A1* | 2/2010 | Chassoulier | G01B 7/144 |
| | | | 702/151 |
| 2010/0188078 A1* | 7/2010 | Foletto | G01R 33/0005 |
| | | | 324/251 |
| 2011/0089874 A1* | 4/2011 | Shimizu | H02P 6/16 |
| | | | 318/400.04 |
| 2012/0139375 A1* | 6/2012 | Masuzawa | F16C 32/0465 |
| | | | 310/90.5 |
| 2012/0146626 A1 | 6/2012 | Bieler et al. | |
| 2013/0134967 A1* | 5/2013 | Kaufmann | H02P 6/185 |
| | | | 324/207.25 |
| 2014/0102220 A1* | 4/2014 | Brummel | G01L 3/105 |
| | | | 73/862.333 |

* cited by examiner

US 10,323,960 B2

METHOD OF MAKING SENSING MECHANISM AND MACHINE SYSTEM USING SAME

TECHNICAL FIELD

The present disclosure relates generally to inductive position sensing, and more particularly to making an inductive position sensing mechanism for a rotatable machine system.

BACKGROUND

Sensing position of components has long been used for controlling machine systems, and for gathering data and monitoring operating state, health and other properties. For many years eddy current sensors, inductive position sensors, and still other strategies such as optical sensing have been used to such ends. Many such systems operate effectively and efficiently, however, there remains room for improvement.

DETAILED DESCRIPTION OF ILLUSTRATIVE EMBODIMENTS

Figure 1:
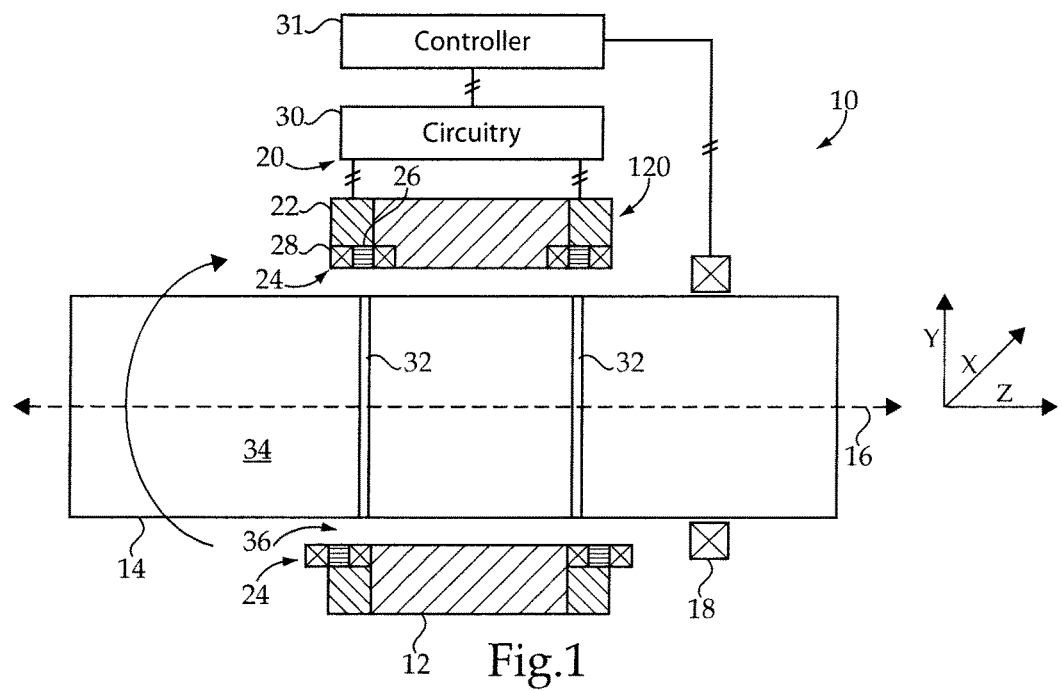
FIG. 1 is a partially sectioned side diagrammatic view of a machine system, according to one embodiment.

Referring to FIG. 1, there is shown a machine system 10 according to one embodiment, and including a housing 12 and a rotatable component 14 within housing 12. Rotatable component 14 may be any of a wide variety of components, and could include a drive shaft, a driven shaft, a rotor in an electric motor or an electrical generator, or various parts of a gas turbine or internal combustion engine. Machine system 10 could thus include not only any of a variety of engine types, but also a pump, a compressor, a power take off or still other devices. In the illustrated embodiment, a bearing 18 in the nature of a non-contact magnetic bearing rotatably journals rotatable component 14. One or more additional bearings, either non-contact bearings or contact bearings may be provided but are omitted from the FIG. 1 illustration. Those skilled in the art will appreciate the desirability of monitoring position of rotatable components in various machine systems. In connection with machine system 10 and potential change to position of rotatable component 14, example X, Y, and Z directions are shown, and machine system 10 is equipped with a sensing mechanism 20 that can sense translational displacement or other position related characteristics such as thermal growth or shrinking of rotatable component 14. In a practical implementation strategy, in addition to sensing mechanism 20, machine system 10 includes a second sensing mechanism 120, typically identical to sensing mechanism 20. Sensing mechanisms 20 and 120 may be axially spaced from one another, and thus together and in a manner further discussed herein adapted to monitor position of rotatable component 14 according to all possible degrees of freedom. Each of sensing mechanisms 20 and 120 may be coupled with machine system housing 12 so as to be positioned in general proximity to relatively highly magnetically permeable material 32 of or positioned upon rotatable component 14. Material 32 might include a ring upon or within component 14, for instance. While the present disclosure is not thusly limited, in a practical implementation strategy component 14 will include both relatively highly magnetically permeable material 32 and relatively less magnetically permeable material 34, of which rotatable component 14 is principally made, enabling function of sensing mechanisms 20 and 120 as high precision inductive position sensors as further described herein.

In a practical implementation strategy, sensing mechanism 20 includes a sensor frame 22 which may have a generally annular configuration, or annular aspects, that extends circumferentially around an axis of rotation 16 defined by rotatable component 14. For purposes of the present description, axis 16 can be considered to be a center axis of sensor frame 22, although it will be appreciated that perturbations to a position of rotatable component 14 can result in a non-coaxial state of the respective components. Coupled to sensor frame 22 are a plurality of sensing elements 24, each of which may include a ferrite core 26 and a winding 28. An air gap 36 extends between sensing elements 24 and rotatable component 14. It has been discovered that ferrite cores may be relatively difficult to manufacture within tight geometric tolerances. For this and other reasons further discussed herein, the present disclosure provides unique strategies for constructing a sensing mechanism and machine system to enable air gap 36 to be made quite small, for example less than 5 millimeters, despite variance in dimensions of ostensibly identical ferrite cores.

As noted above, bearing 18 may include a magnetic bearing that does not contact rotatable component 14 at all. Magnetic bearing 18 could be a permanent magnet bearing in certain embodiments, but could also and will commonly be an electromagnetic bearing that can be actively controlled by way of a controller 31. Controller 31 may be a conventional computerized controller, that receives data indicative of voltages and/or currents in circuitry 30 connecting selected ones of sensing elements 24 in a manner further discussed herein. The sensor input can be used to control bearing 18 in certain embodiments according to known techniques.

Figure 2:
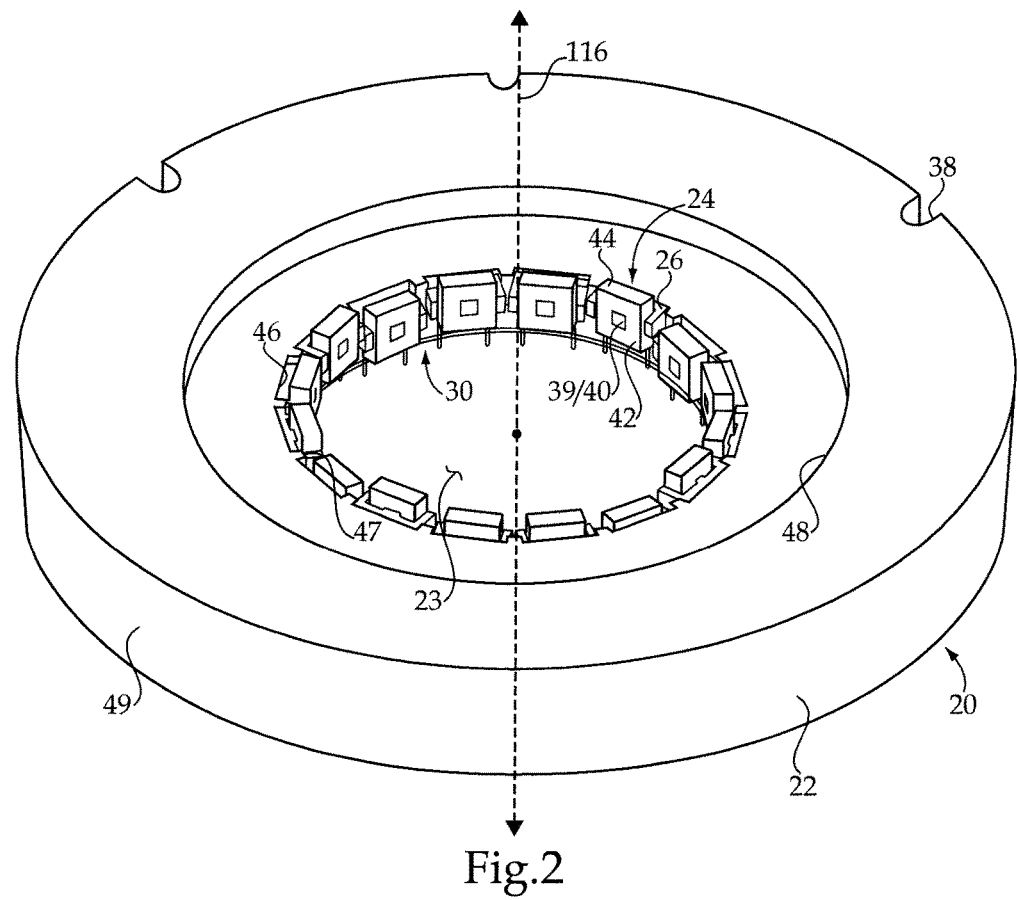
FIG. 2 is an isometric view of a sensing mechanism suitable for use in the machine system of FIG. 1, according to one embodiment.

Referring also now to FIG. 2, there is shown a diagrammatic view of portions of sensing mechanism 20 assembled and ready for connecting with circuitry 30 and controller 31. Parts of circuitry 30 are shown connected with individual ones of sensing elements 24. It can be seen from FIG. 2 that sensor frame 22 includes an inner perimeter 47 and an outer perimeter 49. Inner perimeter 47 defines a center opening 23 with a center axis 116. When assembled for service with the other components of machine system 10, axis 116 will be substantially co-linear with axis 16 in a practical implementation strategy. It can also be seen that a plurality of sensing elements 24 are assembled with sensor frame 22 such that sensing elements 24 are arranged circumferentially about axis 116. It can also be seen that some of sensing elements 24 are axially offset or staggered, not all positioned at the same axial location. As further discussed herein, the axial offset among sensing elements 24 enables sensing displacement of rotatable component 14 in the axial or Z directions, and certain ones of sensing elements 24 may be dedicated to sensing the axial displacement of rotatable component 14. Other ones of sensing elements 24 may be dedicated to sensing displacement in the X direction, while still others may be dedicated to sensing displacement in the Y direction. Depending upon the composition or configuration of rotatable component 14, a position of rotation of component 14 about axis 16 may also be sensed via sensing elements 24 in a known manner. Coupled with input from the sensing elements associated with sensing mechanism 120 to detect tilting, positions of rotatable component 14 in all possible degrees of freedom can be determined. It can also be seen that a void or cutout 48 in sensor frame 22 extends circumferentially around axis 116, the significance of which will be apparent from the following description. Inner perimeter 47 is formed with a plurality of slots into which sensing elements 24 are positioned.

At the state depicted in FIG. 2, sensing elements 24 may be relatively loosely fitted into slots 46, and capable of being adjusted in a radially inward direction, a radially outward direction, and potentially in either of opposed axial directions. As alluded to above, ferrite cores, due to the nature of ferrite material and its manner of manufacturing, can often vary in dimensions more than certain other manufactured components. Sensor frame 22 might be a cast component, or a cast or forged component which is machined to desired dimensions. It has been observed that manufacturing ferrite cores to tolerances as tight as those readily achievable with sensor frame 22 is impossible or at least impractical. For this reason, regardless of the precision with which sensor frame 22 can be formed, variation in dimensions of ferrite cores 26 can be so great as to render setting air gap 36 at a desired size impossible or at least impractical without in situ adjustment and positioning of sensing elements 24. Another way to understand this principle is that air gap 36 cannot readily be made sufficiently small to obtain optimum sensor sensitivity due to inherent variation in the dimensions of ferrite cores 26, without some strategy for fine tuning positions of sensing elements 24 once installed on sensor frame 22.

It can also be seen noted from FIG. 2 that each of ferrite cores 26 has an E-shape, in other words cores 26 may be E-type ferrite cores. Each ferrite core may have three legs, including a middle leg 39 upon which a ferrite core tip 40 is located. It is ferrite core tips 40 that determined the outer boundary of air gap 36. In the case of a cylindrical rotatable component 14, the closer tips 40 are to all being tangent to the same perfect circle, ideally centered on axis 16, the smaller air gap 36 can be made. The present disclosure can be thought of as compensating for the intrinsic, relatively large manufacturing tolerances associated with ferrite cores 26.

Figure 3:
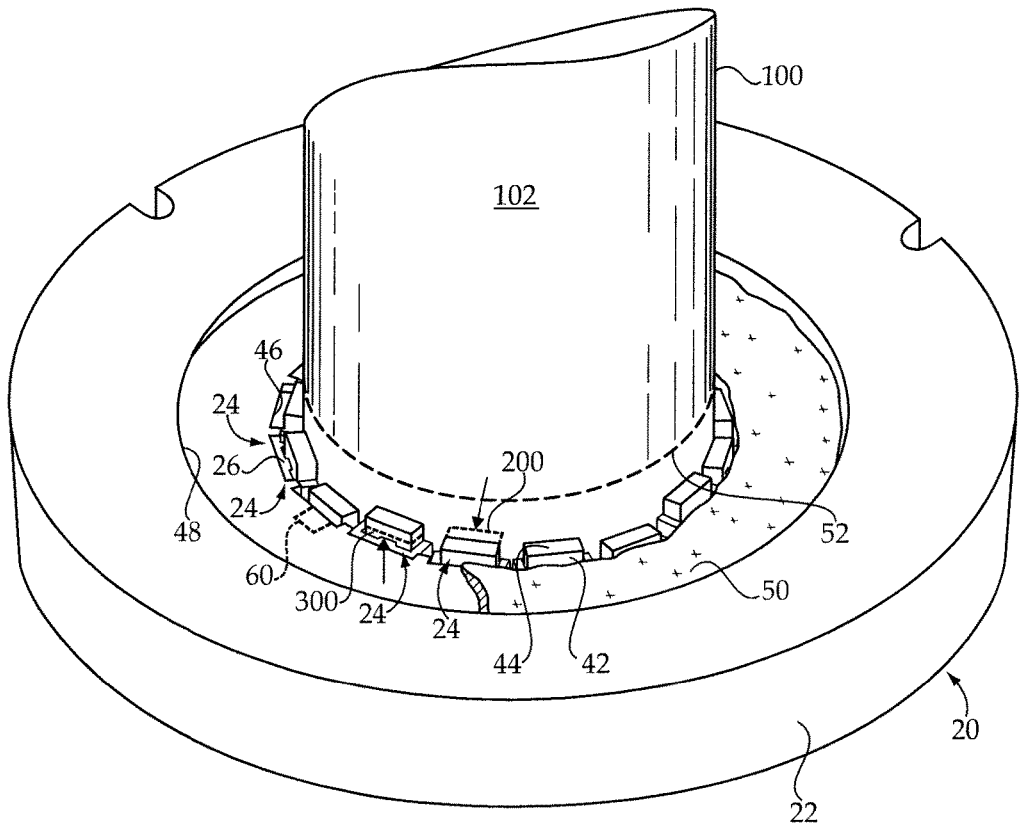
FIG. 3 is a diagrammatic view at one stage of making a sensing mechanism, according to one embodiment.

Referring also now to FIG. 3, there is shown parts of sensing mechanism 20 where sensor frame 22 and sensing elements 24 are positioned about a locating tool 100. Locating tool 100 has been positioned generally co-axially with sensor frame 22 within opening 23 such that ferrite cores 26 of each of sensing elements 24 are simultaneously contacted by an outer surface 102 of locating tool 100. In a practical implementation strategy, locating tool 100 includes a precision machined cylindrical shaft or the like, which can be positioned amongst sensing elements 24 so that a circle 52 is defined by radially inward facing tips 40 on middle legs 39 of ferrite cores 26. In some embodiments, tool 100 could be rotated while positioned within sensor frame 22 and amongst sensing elements 24 to define a more perfect circle. In the illustrated embodiment, circle 52 is shown offset axially from sensing elements 24 for illustrative purposes. It should also be appreciate that circle 52 may be defined by some of sensing elements 24 and one or more additional, axially offset circle (not shown) defined by others of sensing elements 24 axially spaced in position, in other words staggered, from those defining circle 52.

Also shown in FIG. 3 is a first phantom line 200 representing a former location of one of sensing elements 24, and it can be noted the subject one of sensing elements 24 has been pushed radially outward via the contact with outer surface 102 of tool 100. Another phantom line 300 is shown in FIG. 3 and represents a former location of a different one of sensing elements 24, which has been axially adjusted in a desired manner once tool 100 is positioned in contact with sensing elements 24. Axial adjustment could take place by rotating a threaded element coupled with one of the sensing elements, sliding the sensing element in a closely fitted vertical groove, or via other techniques. A bracket 60 is shown in phantom lines in FIG. 3, and is one type that might be used for supporting each one of sensing elements 24 at a selected axial location. It is contemplated that a technician or a robotic assembly system could push sensing elements 24 radially inward to contact tool 100. Tool 100 might additionally or alternatively have a profiled, narrowing diameter such that tool 100 gradually comes into contact with sensing elements 24 and pushes them to a desired location as tool 100 is passed through opening 23. In any event, with sensing elements 24 positioned in the manner desired, where locating tool 100 has conformed an arrangement of sensing elements 24 to a cylindrical shape of surface 102, sensing elements 24 may be secured to sensor frame 22 in the arrangement as conformed via the contact. Tips of ferrite cores 26 may thus define a circle such as circle 52 that lies at an outer boundary of air gap 36 with rotatable component 14, once rotatable component 14 and sensing mechanism 20 are positioned in service in machine system 10. Also shown in FIG. 3 is an adhesive 50 which is shown in partial cutaway and has partially filled void 48, and been allowed to flow in an uncured state into contact with sensing elements 24. Once cured, adhesive 50 will secure sensing elements 24 to sensor frame 22.

In a practical implementation strategy bobbins 42, visible in FIGS. 2 and 3, are positioned upon the middle leg of each ferrite core 26. Windings 44 are positioned upon or about bobbins 42. In a practical implementation strategy, bobbins 42 may be conventional plastic bobbins, and windings 44 may be conventional copper or other conductive material windings. By filling or substantially filling void 48 with liquid adhesive, such as an epoxy, sensing elements 24 can be fixed in position and windings 44 also protected from damage. Embodiments are contemplated where adhesive 50 is flowed over and around and between individual ones of sensing elements 24 to further protect the various components. To improve sensitivity of sensing elements 24, exposed ferrite core tips 40 could be ground to be partially circular in shape so that air gap 36 can be made still smaller and more uniform, and position sensing sensitivity optimized.

Figure 8:
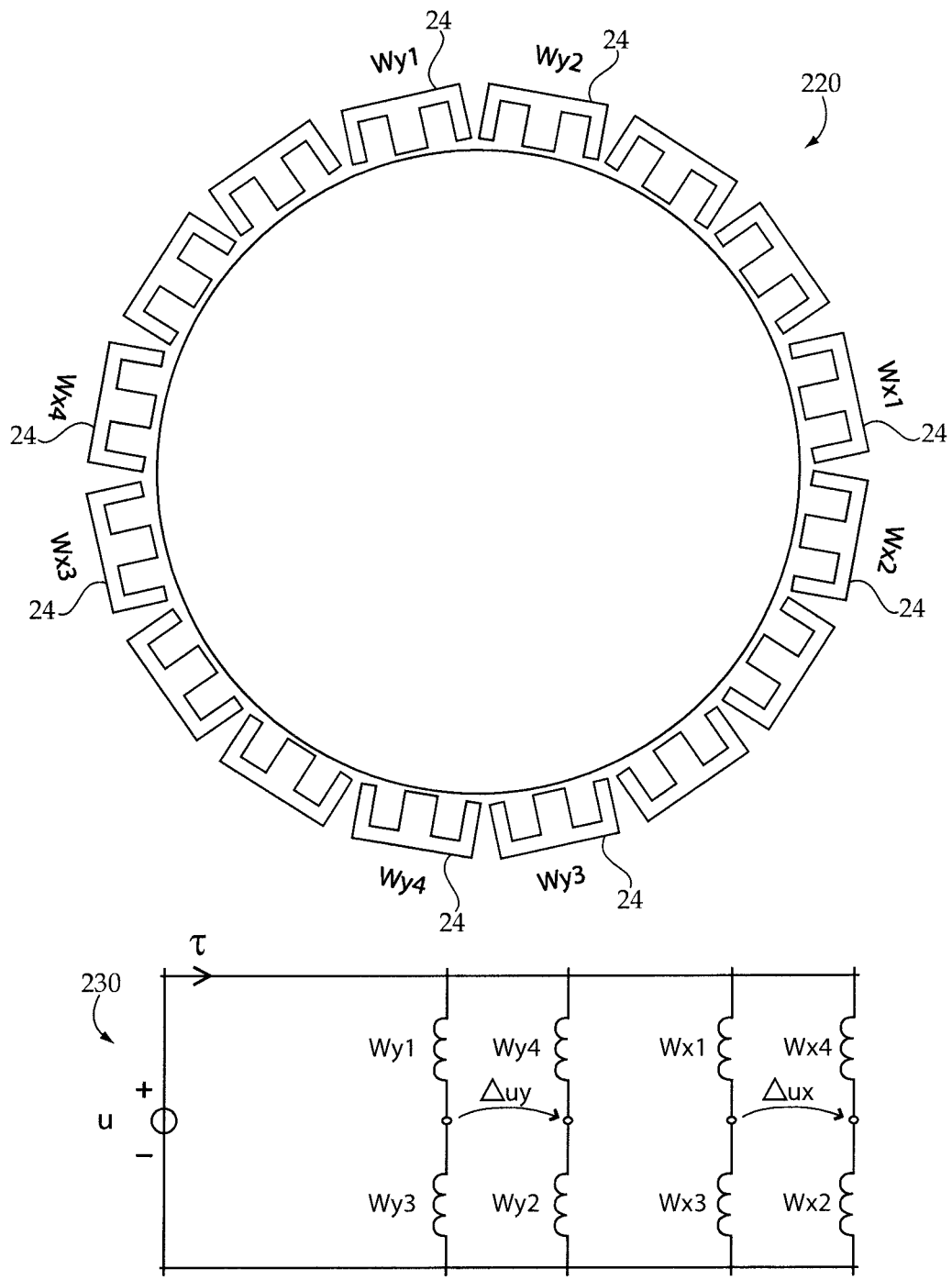
FIG. 8 is a concept diagram of sensing mechanism electrical connections, according to one embodiment.

Referring now to FIG. 8, there is shown a concept diagram of a sensing mechanism 220 including a plurality of sensing elements 24, certain of which are used to sense displacement in the Y direction, vertically. Show in FIG. 8 are four sensing elements 24 labeled Wy1, Wy2, Wy3 and Wy4. A circuit diagram 230 illustrates example connections among those sensors in the form of a bridge circuit including bridge connections among the windings. When displacement of rotatable component 14 is in a vertical direction from the center position, upwards, bridge voltage DELTAuy is positive and when downwards it is negative. Position sensing in the X direction occurs analogously, only 90° turned. Sensing elements Wx1, Wx2, Wx3 and Wx4 are also shown in FIG. 8.

Figure 9:
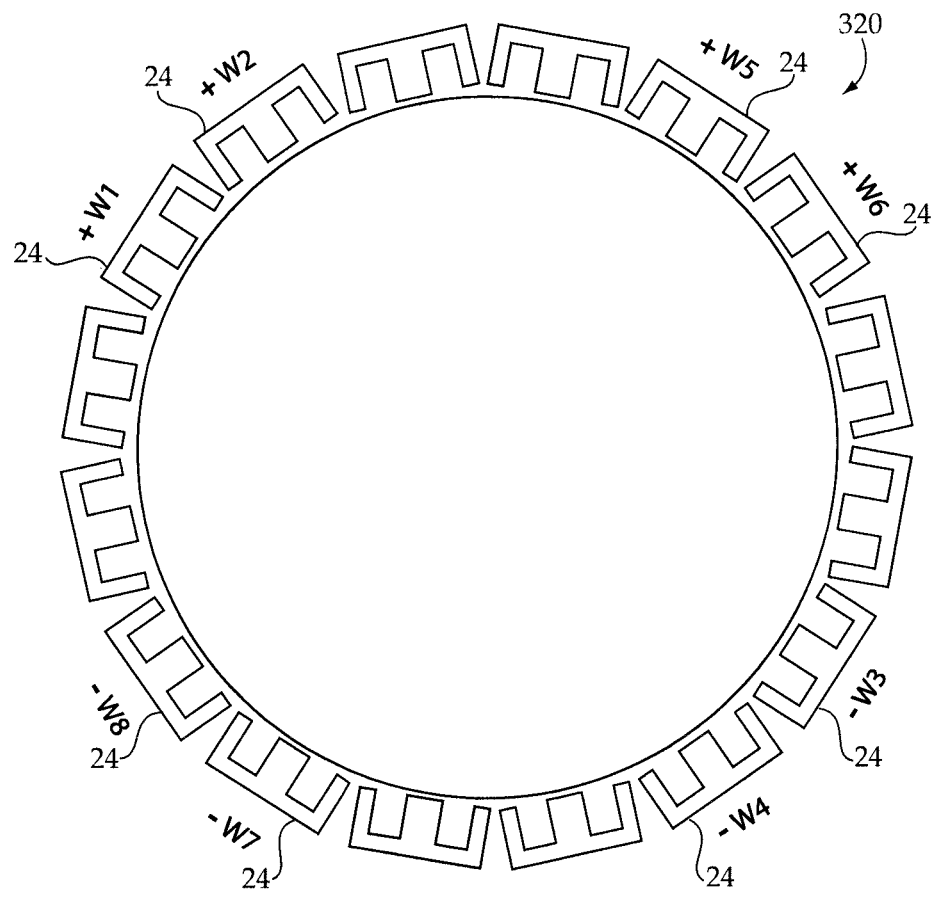
FIG. 9 is another concept diagram similar to FIG. 8.
Figure 9:
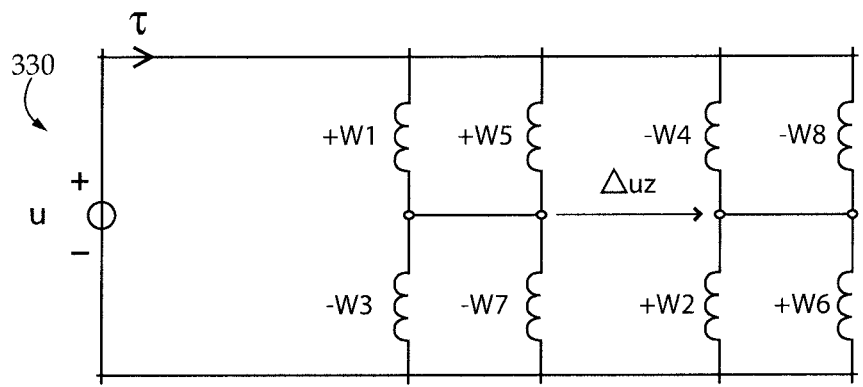
Figure 10:
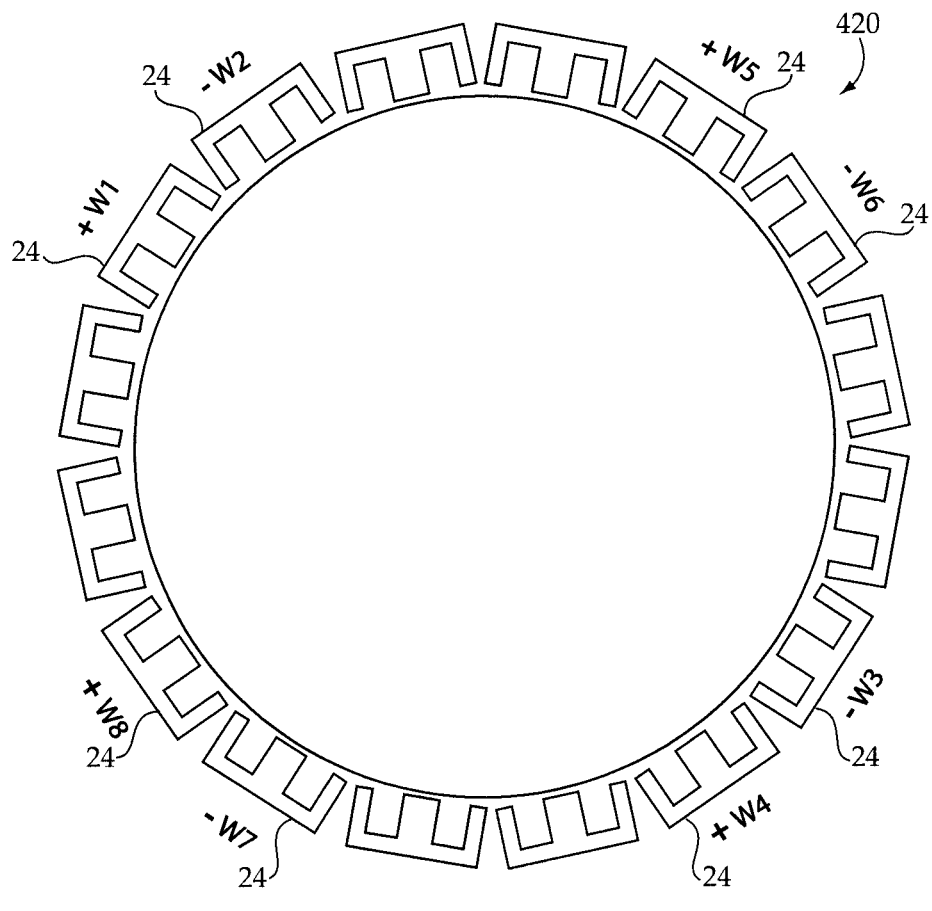
FIG. 10 is another concept diagram similar to FIGS. 8 and 9.
Figure 10:
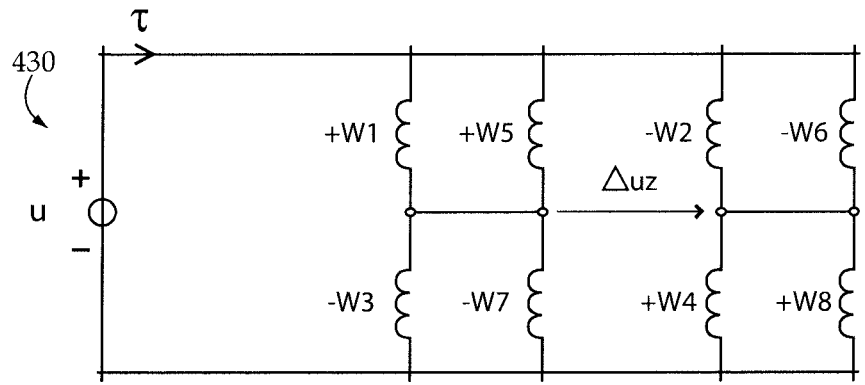

Referring to FIG. 9, for the Z direction, axially, in order to compensate X and Y direction displacements, Z position is measured with eight sensing elements, as labeled for instance in FIG. 9. In one practical implantation strategy, Z cores, in other words ferrite cores in sensing elements dedicated to Z direction sensing, sensing elements W1, W2, W5 and W6 in FIG. 9 are axially displaced in one direction. The plus sign in FIG. 9 also denotes the displacement, thus the associated sensing elements would be understood for instance to be elevated from a plane of the page. Elements W3, W4, W7 and W8 are axially displaced in the opposite direction, also denoted by the minus sign. From circuit diagram 330, it can be seen that DELTAuz denotes a difference between circuit sections, and would be positive for displacement in one axial direction, and negative for displacement in an opposite direction. In FIG. 10, yet another concept sensing mechanism 420 is shown illustrating a different arrangement and connections of sensing mechanisms for monitoring displacement in the Z direction. It can be seen that a different pattern of axial offset for eight sensing mechanisms is used, again where the plus sign indicates axial displacement in one direction and the minus sign indicates axial displacement in an opposite direction. Circuit diagram 430 illustrates an appropriate wiring and connection strategy. Mirror imaged or rotated versions of what is shown in FIGS. 9 and 10 are also feasible.

Figure 4:
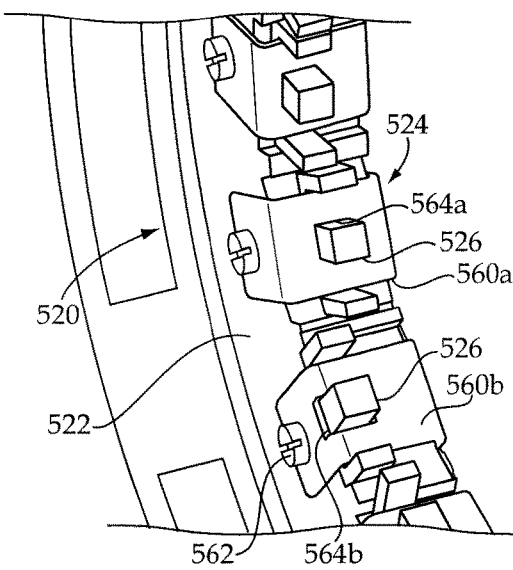
FIG. 4 is a diagrammatic view of a portion of a sensing mechanism, according to one embodiment.

Turning now to FIG. 4, there is shown parts of a sensing mechanism 520 according to another embodiment, and including a sensor frame 522 with a plurality of brackets 560a, 560b, and others upon sensor frame 52 and shaped to retain cores 526 at axially offset locations. In the illustrated embodiment, a first bracket 560a includes a first aperture 564a formed therein and which is located generally half-way between axial end surfaces of sensor frame 522. In other words, aperture 564a is positioned to locate core 526 in a middle position. Bracket 560b has another aperture 564b formed therein which is positioned off of the middle of bracket 560b, and closer to one axial end thereof. Accordingly, the core 526 positioned by bracket 560b is axially offset from the core positioned by bracket 564a. Fasteners 562 extend through brackets 560a, 560b and through sensor frame 522. Those skilled in the art will readily envision the use of brackets such as those shown in FIG. 4 in connection with the assembly and manufacturing process depicted in FIG. 3 and elsewhere. For locations where it is desirable to have ferrite cores axially offset in one direction, bracket 560b could be installed in a first orientation. Where it is desirable to position the core 526 axially offset in the other direction, bracket 560b could be flipped to reposition aperture 564b and therefore reposition core 526. Brackets such as bracket 560a which are generally symmetrical could be used where no relative axially offset of the ferrite core is desired.

Figure 5:
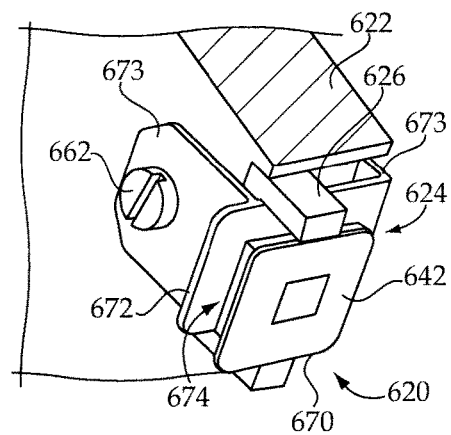
FIG. 5 is a diagrammatic view of a portion of a sensing mechanism, according to another embodiment.
Figure 6:
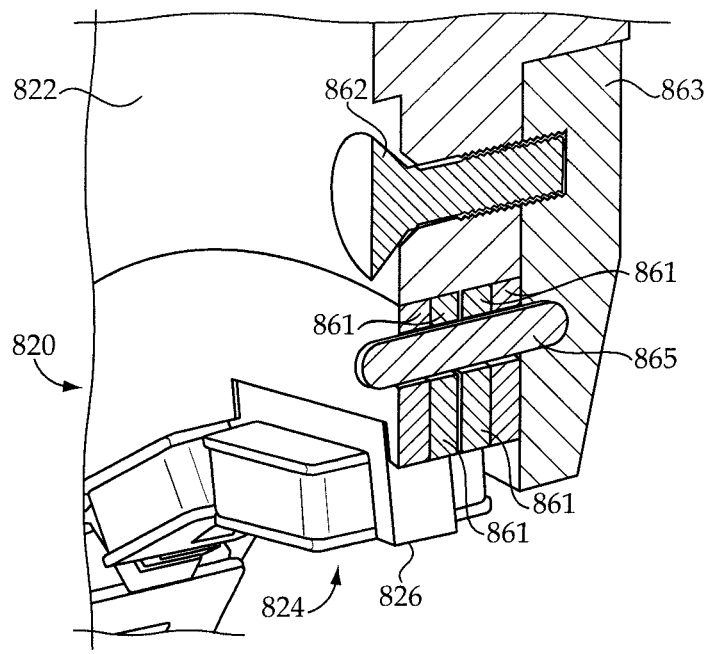
FIG. 6 is a diagrammatic view of a portion of a sensing mechanism, according to yet another embodiment.
Figure 7:
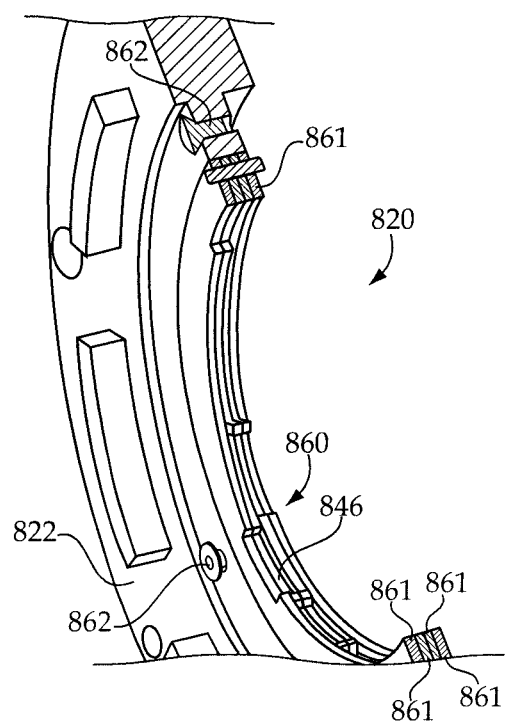
FIG. 7 is a diagrammatic view of a portion of a sensing mechanism according to yet another embodiment.

Referring now to FIG. 5, there is shown parts of a sensing mechanism 620 according to yet another embodiment, and where a combination bobbin and bracket 642 is positioned upon a sensor frame 622, and positions and orients a core 626. Device 642 may have a set of legs 673 which are positionable upon opposition axial sides of sensor frame 622, a fastener such as a bolt or the like 662 that passes through device 642 and sensor frame 622, and first and second panels 672 and 670 which are positionable about the middle leg of core 626. A recess 674 extends between panels 670 and 672 and would receive a winding (not shown) in a practical implementation strategy. Referring now to FIGS. 6 and 7, there are shown in two different views parts of a sensing mechanism 820 according to yet another embodiment, where still other strategies are used for positioning a plurality of sensing elements 824 within a sensor frame 822. In sensing mechanism 820, a plurality of annular or partly annular positioning elements 861 are coupled to sensor frame 822, for instance by way of a first set of fasteners 862 and a plurality of pins 865, and a clamping plate 863. It can be seen that fasteners 862 pass through sensor frame 822 and are threadedly engaged with clamping plate 863. Pins 865 extend through layers 861 to position the plurality of sensing elements 824 and couple sensing elements 824 to sensor frame 822. In one embodiment, components 861 can be independently rotated relative to one another to create and position a plurality of slots 846. In one assembly configuration of components 861, slots at a first set of positions or depths will exist. In a different assembly configuration of components 861, slots 846 will be at different positions and/or depths. It is contemplated that components 861 may have 3, 4, 5 or more assembly configurations allowing slots that receive and position cores 826 at a great many different locations. Slots 846 can be positioned so that cores 826 are substantially axially midway through sensor frame 822, axially displaced one way, or axially displaced the other way.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A method of making a sensing mechanism for monitoring a position of a rotatable component in a machine system comprising:
   assembling a plurality of separate sensing elements with a sensor frame such that ferrite cores of the sensing elements which are made separate from the sensor frame are integrated with and positioned relative to the sensor frame as a result of the assembling and are arranged circumferentially about an axis;
   contacting a locating tool simultaneously to the ferrite cores in each one of the sensing elements so as to conform the arrangement of the sensing elements to a cylindrical shape of a surface of the locating tool; and
   securing the sensing elements to the sensor frame after conforming the arrangement, such that tips of the ferrite cores define a circle positioned at a boundary of an air gap between the sensing mechanism and the rotatable component when positioned for service in the machine system.

2. The method of claim 1 wherein the contacting of the locating tool adjusts a radial position of at least one of the sensing elements.

3. The method of claim 1 wherein tips of the ferrite cores face a radially inward direction, and the contacting of the locating tool includes conforming the arrangement to the cylindrical shape of an outer surface of the locating tool.

4. The method of claim 3 wherein the ferrite cores include E-type ferrite cores where the corresponding tip is located on a middle leg of the E shape.

5. The method of claim 4 further comprising positioning a plurality of bobbins each coupled with a winding, upon middle legs of the E shape in each of the sensing elements, prior to the contacting of the locating tool.

6. The method of claim 5 further comprising connecting each of the windings to an alternating current (AC) voltage source, and to at least one other of the windings via a bridge connection.

7. The method of claim 6 further comprising sensitizing a first, a second, and a third group of the sensing elements to displacement of the rotatable component in X, Y, and Z directions, respectively, via the connecting.

8. The method of claim 1 wherein securing the sensing elements includes securing the sensing elements to the sensor frame via an adhesive.

9. The method of claim 1 wherein assembling the plurality of sensing elements includes assembling at least some of the sensing elements at staggered locations along the axis.

10. A machine system comprising:
   a housing;
   a rotatable component within the housing and defining an axis of rotation, and the rotatable component being movable relative the housing in X, Y, and Z directions;
   a sensing mechanism including a plurality of sensing elements mounted to a sensor frame and arranged about the axis of rotation, and each of the sensing elements including a ferrite core and a winding about the ferrite core, and the sensing elements including a first, a second, and a third group;
   an alternating current (AC) voltage source; and
   circuitry connected to the AC voltage source and including bridge connections among the windings of the first group, among the windings of the second group, and among the windings of the third group, such that the bridge connections have output voltages linearly dependent upon positions of the rotatable component relative the sensing mechanism in each of the X, Y, and Z directions, respectively, wherein the AC voltage source is structured to output AC power including a voltage and current to the circuitry effective to provide the current to windings of the third group;
   wherein each of the ferrite cores of the sensing elements includes an E-type core, and further including a plurality of brackets each having an aperture therein structured to capture a leg of the E-type such that the plurality of brackets discourage relative movement of the ferrite cores.

11. The system of claim 10 wherein the corresponding winding is positioned about the center leg of the E shape.

12. The system of claim 11 wherein the center legs of each of the ferrite cores project radially inward toward the axis of rotation, and an air gap extends between the rotatable component and tips of the center legs.

13. The system of claim 11 wherein the ferrite cores in each of the first group and the second group of the sensing elements are arranged in a first plane, and the ferrite cores in the third group are arranged in at least one other plane axially offset from the first plane.

14. The system of claim 11 further comprising a plurality of bobbins supporting the windings, and each of the bobbins being formed integrally with one of the plurality of brackets.

15. A method of making a machine system comprising:
   assembling a plurality of sensing elements each having a ferrite core and which are separate from one another with a sensor frame such that the sensing elements are separately integrated with the sensor frame and arranged circumferentially about an axis of the sensor frame;
   locating ferrite cores of each of the sensing elements such that tips of some of the ferrite cores define a first circle, and tips of some of the ferrite cores define a coaxial and axially offset circle;
   securing the sensing elements to the sensor frame;
   positioning a rotatable component of the machine system within the sensor frame such that an air gap extends between the ferrite cores and a surface of the rotatable component; and
   forming bridge connections among the windings so as to sensitize the sensing mechanism to displacement of the rotatable component in X, Y, and Z directions.

16. The method of claim 15 wherein each of the ferrite cores includes an E-type core.

17. The method of claim 16 wherein securing the sensing elements to the sensor frame includes securing the sensing elements via an adhesive.

18. The method of claim 16 wherein securing the sensing elements includes securing the sensing elements while a locating tool extends through the sensor frame and simultaneously contacts each of the ferrite cores.

* * * * *